United States Patent [19]

Kamigaito et al.

[11] Patent Number: 4,486,235

[45] Date of Patent: Dec. 4, 1984

[54] CLAY MINERAL SHEET

[75] Inventors: Osami Kamigaito; Haruo Doi; Yoshiaki Fukushima, all of Nagoya, Japan

[73] Assignee: Kabushiki Kaisha Toyota Chuo Kenkyusho, Tokyo, Japan

[21] Appl. No.: 506,222

[22] Filed: Jun. 21, 1983

Related U.S. Application Data

[60] Division of Ser. No. 417,067, Sep. 10, 1982, abandoned, which is a continuation-in-part of Ser. No. 234,002, Feb. 12, 1981, abandoned.

[30] Foreign Application Priority Data

Feb. 18, 1980 [JP] Japan .................................. 55-18644
Jul. 31, 1980 [JP] Japan ................................ 55-105379

[51] Int. Cl.[3] .......................... C09K 3/00; B05D 1/18; B32B 5/16
[52] U.S. Cl. ........................... 106/287.12; 106/287.16; 427/443.2; 428/402; 428/404; 428/405; 428/447; 162/181.6
[58] Field of Search .............. 106/287.12, 287.16; 428/405; 162/181.6; 427/443.2

[56] References Cited

U.S. PATENT DOCUMENTS

| | | | |
|---|---|---|---|
| 2,791,262 | 5/1957 | Budnik | 427/443.2 |
| 3,056,704 | 10/1962 | Rothweiler et al. | 427/443.2 |
| 4,175,159 | 11/1979 | Raleigh | 428/405 |
| 4,258,102 | 3/1981 | Traver | 428/331 |
| 4,269,628 | 5/1981 | Ballard et al. | 106/DIG. 3 |
| 4,271,228 | 6/1981 | Foster et al. | 428/281 |
| 4,299,628 | 5/1981 | Ballard | 106/86 |

FOREIGN PATENT DOCUMENTS

| | | |
|---|---|---|
| 1016385 | 1/1966 | United Kingdom . |
| 1076786 | 7/1967 | United Kingdom . |
| 1119305 | 7/1968 | United Kingdom . |

*Primary Examiner*—Theodore Morris
*Attorney, Agent, or Firm*—Berman, Aisenberg & Platt

[57] ABSTRACT

The vermiculite sheet is immersed in a silane compound in liquid state so that the silane compound is permeated into the sheet to react with the water absorbed on the whole surface of each thin leave of vermiculite and to form silanol. Thin leaves of vermiculite are strongly bonded with one another through such silanol to form a strong composite sheet.

6 Claims, No Drawings

CLAY MINERAL SHEET

CROSS-REFERENCE TO RELATED APPLICATION

This application is a divisional application of our copending application Ser. No. 417,067 filed on Sept. 10, 1982 (now abandoned), which is a continuation-in-part application of our copending application Ser. No. 234,002 filed on Feb. 12, 1981 now abandoned.

BACKGROUND OF THE INVENTION

1. Field of the Invention:

This invention relates to a clay mineral sheet, which can be effectively used as, for example, intermediates between members, such as gasket and packing.

2. Description of the Prior Art:

There are clay mineral sheets composed mainly of a flaky clay mineral, such as mica and montmorillonite. Only a very thin sheet is, however, available in order to obtain the necessary flexibility. There are also known heat resistant sheets composed mainly of fibrous substance, such as asbestos, glass fiber and sepiolite. They, however, have a low modulus of elasticity along their thickness or poor creep resistance. Moreover, fibrous materials are often expensive or difficult to obtain. There are also known sheets composed mainly of organic compound elastomer (rubber) and sheets composed mainly of graphite in the form of scales. However, organic compound sheets have poor heat and oil resistances, and graphite sheets are very expensive although they have required properties of a heat-resistant gasket or the like.

There is also a rigid foam or sheet formed of swollen vermiculite and a water-stable additive, or a sheet material in the form of a fibrous web containing exfoliated vermiculite. However, the conventional materials do not concurrently possess high flexibility, high tensile and compressive strength, excellent recovery and other properties required for gaskets or the like.

SUMMARY OF THE INVENTION

One object of the invention is to provide an improved clay mineral sheet useful as an intermediate member, such as a gasket or the like, having high flexibility, high heat resistance, high tensile and compressive strength, high recovery or low creep relaxation and excellent sealability even after prolonged use.

Another object of the invention is to provide the above-mentioned sheet with ease of manufacture and at low cost.

A further object is to provide the above-mentioned sheet having further properties, such as water resistance, oil and chemical resistance, electrical resistance, oxidation resistance, and harmlessness to the human body.

These and other objects of the invention, as will hereinafter become more readily apparent, can be attained by providing a sheet of vermiculite and silanol, the latter being on and among thin leaves of vermiculite, and strongly bonding the thin leaves with one another to form a strong composite sheet.

DETAILED DESCRIPTION

Vermiculite to be employed in the present invention is a flaky mineral formed essentially by layers of aluminum silicate, and containing aluminum, iron or the like substituted at random for silicon atoms in the tetrahedral positions, thereby retaining exchangeable cations and water between layers. Its typical chemical formula is as follows:

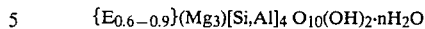

in which E stands for an exchangeable cation. Mica, which is also a flaky mineral, is represented as:

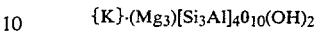

and montmorillonite is expressed as:

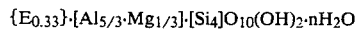

Vermiculite is distinguished from mica and montmorillonite in chemical constitution, particularly the $Al_2O_3/SiO_2$ ratio, and the composition of ions between layers. It is also different from mica and montmorillonite in peak position and width in X-ray diffraction, the mode of substitution by other ions in tetrahedral positions, the state of water between layers, cation exchange capacity, degree of swelling with organic matter, or the like.

It is known that vermiculite exfoliates in the form of an accordion when heated at a temperature of about 1,000° C., and exfoliated vermiculite is used as a soil improver for use in gardening, or an aggregate for lightweight concrete, or for other purposes. Vermiculite is also exfoliated when contacted with aqueous hydrogen peroxide or the like.

The thin leaves of vermiculite to be employed in this invention can be easily obtained by crushing or vibrating such exfoliated vermiculite. Vermiculite may be exfoliated by heat treatment at about 300° to 1,000° C. for several minutes or by chemical treatment in the presence of aqueous hydrogen peroxide for several hours.

The thin leaves of vermiculite are laminar pieces consisting mainly of aluminum silicate, and formed by the separation of aluminum silicate layers defining the substrate of vermiculite, which is caused by dispersion of water from among the layers of vermiculite or due to oxygen gas existing among the layers.

The thin leaves consist of from one layer to several thousand layers of aluminum silicate. It has a thickness not exceeding 100μ, and the ratio of the square root of its surface area to its thickness (aspect ratio) is at least 5. The individual thin leaves per se have a certain degree of flexibility because of their small thickness. The relatively high aspect ratio gives a definite direction to the C axis of an aluminum silicate layer when it is formed by natural sedimentation, filtration, compression molding, or a method similar to papermaking. These thin leaves are saliently featured by having a large surface area relative to their thickness, i.e., a high aspect ratio, and the sheet of this invention is primarily based on the high aspect ratio of thin leaves. The shape and aspect ratio of thin leaves differ with the crushing method and time. The thin leaves obtained by crushing by a mixer have a higher aspect ratio than those obtained by mortar and pestle or a ball mill, and the thin leaves obtained by mortar and pestle have a higher aspect ratio than those obtained by a ball mill. Crushing may be perfomed either by a dry system or by a wet system. For example, thin leaves mainly having a thickness of not more than 0.1μ to 10μ and a surface area of about 2,500μ² to 1,000,000μ² were obtained when heated vermiculite was crushed in water for 5 to 30 minutes by a mixer.

When heated vermiculite was crushed for 10 hours in a wet condition by a ball mill, there were obtained thin leaves having a thickness not exceeding $0.5\mu$, and a surface area of about 1 to $100\mu^2$. The thin leaves obtained by crushing vermiculite exfoliated by chemical treatment have a higher aspect ratio, as compared with those obtained by crushing vermiculite exfoliated by heating. Further, the clay mineral sheet of thin leaves of vermiculite obtained by use of chemical treatment is given such property that the sheet is expandable when heated or chemically treated. Non-heated or non-exfoliated vermiculite may be incorporated to provide a sheet capable of expanding again at a high temperature. The sheet may be formed as a integral body with a metal plate or a metal leaf.

The clay mineral sheet of this invention is formed by stacking in layers the aforesaid thin leaves and uniting them with one another. The thin leaves may be stacked in layers or laminated by a method in which they are dispersed in a liquid, such as water, and allowed for sedimentation on the bottom, or forcibly filtered for deposition on a filter, or a method which is similar to the papermaking process, or a method in which a slurry is formed from the thin leaves and an appropriate liquid and coated on a flat plate, or otherwise. In order to unite thin leaves together, it is possible to evaporate a liquid and utilize the bonding force developed by such evaporation if a stack or laminate of thin leaves contains any such liquid, or to press both sides of the laminate and apply a heavy pressure thereon.

According to the present invention, the clay mineral sheet is treated with a silane compound. The silane compound is allowed to enter the sheet between or among thin leaves of vermiculite and to react chemically with the water absorbed on the whole surface of each thin leaves, thereby to form a strong composite sheet of vermiculite and silanol.

Silane compounds to be employed in the present invention preferably have a property of polymerization by themselves. Such silane compounds include chlorosilane represented by the general formula: $R_{(4-n)}SiCl_n$, in which R stands for one of hydrogen and organic radicals, such as $-H$, $-CH_3$, $-C_2H_3$, $-C_2H_5$, $-C_3H_7$, $-C_4H_9$, $-C_6H_5$ and the like, and n stands for one of 1, 2, 3 and 4. Typical examples of chlorosilane are dichlorodimethylsilane $((CH_3)_2SiCl_2)$, trichlorosilane $(HSiCl_3)$, dichlorodiphenylsilane $((C_6H_5)_2SiCl_2)$, trichlorovinylsilane $((C_2H_3)SiCl_3)$ and dichloromethylvinylsilane $((C_2H_3)(CH_3)SiCl_3)$.

Alkoxysilane is also employable as the silane compound. It is represented by the general formula: $R_{(4-n)}Si(OR')_n$, in which R and R' stand for one of hydrogen and organic radicals, such as $-H$, $-CH_3$, $-C_2H_3$, $-C_2H_5$, $-C_3H_7$, $-C_4H_9$, $-C_6H_5$ and the like, and n stands for one of 1,2,3 and 4. The silane compounds of this kind are, for example, dimethoxydimethylsilane $((CH_3)_2Si(OCH_3)_2)$ and triethoxyvinylsilane $((C_2H_3)Si(OC_2H_5)_3)$.

One or more silane compounds are employed preferably in a solution of about 10 to 100% by weight thereof so that the resultant sheet includes silanol in the amount of 0.5 to 5% by weight based on the weight of the sheet. Silane compound is either in a liquid state or dissolved in a non-polar solvent, such as toluene, benzene and hexane, and thus has a low viscosity. Therefore, when the sheet of vermiculite is immersed in the silane compound, the silane compound permeates into the sheet of vermiculite between or among the thin leaves thereof. The vermiculite sheet, after such permeation, still retains its shape without being separated into thin leaves.

The silane compound permeated into the vermiculite sheet reacts with water absorbed on the surface of each thin leave of vermiculite and chemically bonds with these thin leaves. Namely, the hydrolysis of the silane compound occurs while hydrogen chloride or alcohol is generated, resulting in the formation of silanol on and within the sheet.

Namely, there is obtained a strong composite sheet in which silanol having a large molecular weight and thin leaves of vermiculite are chemically bonded together thereby strongly bonding the thin leaves with one another through such silanol.

The composite sheet thus obtained has excellent tensile and compressive strength, good recovery or sealability even after prolonged use and high flexibility due to the strong chemical bond between the thin leaves of vermiculite and silanol. The composite sheet also has excellent heat resistance and is substantially waterproof.

The amount of silanol in the composite sheet is preferably from 0.5 to 5% by weight based on the whole weight of the sheet. If the amount of silanol is less than 0.5% by weight, the bonding force between thin leaves will be reduced. If the amount of silanol is more than 5% by weight, creep relaxation, recovery and heat resistance of the sheet will be degraded.

The method for manufacturing the sheet of this invention by filtering the thin leaves dispersed in water and pressing the resulting laminate is particularly effective when thin leaves having a high aspect ratio or retaining the property of swelling with water are used. For this purpose, vermiculite is preferably heated at the lowest possible temperatures (300° to 500° C.) for effecting exfoliation of vermiculite, and crushed by a wet-type mixer.

The method for manufacturing the sheet by coating a slurry and drying it is effective for thin leaves having a fine particle size, and makes it possible to obtain a thin and strong sheet. A lot of time is, however, required for drying the sheet.

The method for manufacturing the sheet by utilizing the papermaking process is effective for thin leaves having a high aspect ratio.

As for a method for exfoliating vermiculite by chemical treatment, vermiculite is immersed in an aqueous solution of several to several tens percent of hydrogen peroxide for several hours at room temperature.

The sheet of the invention may further include additives, such as fibers, if desired.

The sheet of the invention preferably has a density ranging from 1.0 to 2.6 g/cm$^3$. This sheet is most effective and suited for prolonged use at a high temperature under a highly clamped condition. It can be used, for example, as a cylinder head gasket, or a gasket and cushion material for securing a member of brittle material such as ceramics to a metal plate by screwing means.

Having generally described this invention, a further understanding can be obtained by reference to certain specific examples which are provided herein for purposes of illustration only and are not intended to be limiting unless otherwise specified.

EXAMPLE 1

Gold exfoliated vermiculite produced in Japan, and having a particle size designated as (5)(i.e., 0.3 to 5 mm) according to JIS A5009-1972 (Japanese Industrial Standard) was used as the raw material. A mixture comprising 30 g of the raw material and 1,000 cc of water was crushed for 10 minutes by a mixer having four steel stirring blades, each having a diameter of about 55 mm and operating at a rotating speed of about 10,000 rpm. The powder thereby obtained consisted of thin leaves having a thickness of not more than $0.1\mu$ to $10\mu$ and a surface with one side of several tens of to several thousand microns, hence an aspect ratio of 10 to 10,000. An aqueous suspension of these thin leaves was forcibly filtered by using a Buchner funnel having a diameter of about 16 cm, a suction bottle having an internal volume of about eight liters and a disc of filter paper No. 5A having a diameter of 15 cm, and evacuating the suction bottle by a water jet pump for forced filteration of the suspension, followed by drying at 55° C. for 10 hours, whereby a vermiculite plate was obtained. The suspension was divided into four or five portions for filtration of all of the aforesaid quantities (30 g of vermiculite and 1,000 cc of water), whereby there were obtained four or five sheets of vermiculite having a diameter of about 13 cm and a thickness of about 0.1 to 0.5 mm. Doughnut-shaped sheets having an inside diameter of 60 mm and an outside diameter of 70 mm were stamped out of the vermiculite sheets. About 10 doughnut-shaped sheets were stacked one upon another, and placed in a mold for molding tubular products having an inside diameter of 60 mm and an outside diameter of 70 mm, and compressed by a hydraulic press with a pressure of 1,000 kg/cm$^2$, whereby there was obtained a molded vermiculite product shaped like a doughnut and having an inside diameter of 60 mm, an outside diameter of 70 mm and a thickness of 2 to 5 mm. The properties of the molded product are shown in TABLE 1. The molded product was used as a gasket for an autoclave. It was subjected to an autoclave temperature of 230° C. and a steam pressure of 28 atm. for 24 hours, followed by cooling down to room temperature. Such heating (pressurization) and cooling were repeated 10 times, but the vermiculite gasket did not show any change, but retained a high degree of gastightness.

TABLE 1

| | |
|---|---|
| Density | 2.2 g/cm$^3$ |
| Withstanding temperature in atmospheric air | ≦800° C. |
| Modulus of elasticity (along its thickness) | 0.27 × 10$^4$ kg/cm$^2$ |
| Compressive strength | 500 to 1,000 kg/cm$^2$ |
| Thermal conductivity at 37° C. | 0.32 Kcal/m · hr · °C. |
| Coefficient of thermal expansion (along its diameter) | 6.15 × 10$^{-6}$ (cm/cm)/°C. |
| Coefficient of thermal expansion (along its thickness) | 12.6 × 10$^{-6}$ (cm/cm)/°C. |

EXAMPLE 2

A vermiculite sheet obtained by the same method as in EXAMPLE 1, having a diameter of about 150 mm and a thickness of 0.1 to 0.5 mm was cut with a cutter to obtain sheets measuring 105 mm by 55 mm. About 10 such sheets stacked one upon another and one steel sheet (Fe—13Cr—1Mo—0.4C) measuring 104 mm by 54 mm by 40$\mu$ interposed therebetween were placed in a mold measuring 105 mm by 55 mm, and compressed by a hydraulic press with a pressure of 1,000 kg/cm$^2$. Thus, a gasket material measuring 105 mm by 55 mm by 2 mm was obtained. The properties of the gasket material are shown in TABLE 2. The gasket thus obtained possesses the properties required of a gasket for an engine of an automobile or the like.

TABLE 2

| | |
|---|---|
| Density | 2.6 g/cm$^3$ |
| Withstanding temperature in atmospheric air | ≦700° C. |
| Compressive strength | 500 kg/cm$^2$ |
| Tensile strength | 150 kg/cm$^2$ |
| Compressibility | 20 to 30% (maximum load 200 kg/cm$^2$) |
| Recovery | 90% (maximum load 200 kg/cm$^2$) |
| Immersion test | thickness increase ≦ 2% (gasoline 25° C., 5 hours) |
| Creep relaxation | 4% (200 kg/cm$^2$, 22 hours) |

EXAMPLE 3

Fifteen grams of gold exfoliated vermiculite of the particle size (5) produced in Japan (as in EXAMPLE 1), 15 g of nonexfoliated vermiculite produced in China and 1,000 cc of city water were crushed for 10 minutes at 10,000 rpm using the same mixer as used in EXAMPLE 1. The thin leaves thus obtained from a mixture of exfoliated and nonexfoliated vermiculite were divided into several portions for forced filtration by using a Buchner funnel having a diameter of about 16 cm, a suction bottle having an internal volume of eight liters and a disc of filter paper No. 5A having a diameter of 150 mm, and evacuating the suction bottle by a water jet pump, followed by drying at 55° C. for 10 hours, whereby vermiculite sheets having a diameter of about 13 cm and a thickness of 0.2 to 0.5 mm were obtained. These sheets of vermiculite were cut with scissors for deskwork use to form sheets measuring 10 mm by 50 mm. About 10 such sheets were stacked one upon another, placed in a mold measuring 10 mm by 50 mm, and compressed by a hydraulic press with a pressure of 2,000 kg/cm$^2$, whereby a molded product measuring 10 mm by 50 mm by 2 to 5 mm in thickness was obtained. The molded product was placed in an electric oven maintained at 900° C. and, after it was held therein for two minutes, the sample was taken out and cooled to room temperature. This treatment caused the molded product to expand into the shape of an accordion and to obtain a thickness which was 1.2 to two times greater than its original thickness. TABLE 3 shows the properties of the sample thus obtained (Sample 1), and of the sample obtained by the immersion thereof in dichlorodimethylsilane for about two minutes (Sample 2). Thereafter, the latter was kept in a room at 25° C. under a humidity of 70% for 24 hours, followed by heating at 100° C. for 2 hours. It was confirmed through DTA (Differential Thermal Analysis) and TGA (Thermogravity Analysis) that the product included 4.8% by weight of silanol.

The molded product thus obtained possesses the properties required of a gasket for an automobile.

TABLE 3

| | Sample 1 | Sample 2 |
|---|---|---|
| Density | 1.0 to 2.0 g/cm$^3$ | |
| Withstanding temperature in atmospheric air | ≦800° C. | ≦300° C. |
| Compressive strength | 500 to 1,000 kg/cm$^2$ | |
| Tensile strength | 50 to 200 kg/cm$^2$ | |
| Compressibility (200 kg/cm$^2$) | 20 to 30% | |
| Recovery (200 kg/cm$^2$) | 80% | 90% |

TABLE 3-continued

| | Sample 1 | Sample 2 |
|---|---|---|
| Immersion test (lubricant) | No change | |
| (fuel oil) | No change | |
| Creep relaxation (200 kg/cm² for 22 hours) | Not greater than 4% | |

EXAMPLE 4

One kilogram of vermiculite produced in South Africa and one liter of hydrogen peroxide were placed in a container of polypropylene having an internal volume of 15 l and kept at room temperature for 24 hours to obtain exfoliated vermiculite. A mixture comprising 50 g of the exfoliated vermiculite and 1 l of water was crushed for 3 minutes by a mixer with steel stirring blades having an internal volume of 1.5 l and operating at a rotating speed of 15,000 rpm. The thin leaves of vermiculite thus obtained have a thickness of not more than $0.1\mu$ and a particle size of 10 to $1,000\mu$. An aqueous suspension of these thin leaves was filtered by using a TAPPI standard sheet machine, and compressed under a pressure of 1 kg/cm², followed by heating and drying at 100° C. Thus, a vermiculite plate measuring 250 mm±200 mm±1 mm was obtained.

The vermiculite sheet thus obtained was immersed for 1 minute in a solution in which 23 g of dichlorodimethylsilane $((CH_3)_2SiCl_2)$ and 2 g of trimethylchlorosilane $((CH_3)_3SiCl)$ are dissolved in 50 cc of toluene. The silane compounds were uniformly intercalated into the vermiculite sheet and then reacted with water absorbed on the surface of each thin leaf of vermiculite while generating hydrochloric acid. The vermiculite sheet was then dried at room temperature of 20° C. for 24 hours and then heated at 200° C. for 2 hours. It was confirmed through DTA and TGA that the vermiculite sheet included 1.5% by weight of silanol.

The vermiculite sheet obtained by this method had a tensile strength of 250 kg/cm², a compressive strength of not less than 1,500 kg/cm², a recovery of 90% under a pressure of 200 kg/cm² and a creep relaxation of not more than 4% under a pressure of 200 kg/cm² for 22 hours. When the vermiculite sheet was heated at 400° C for 1 hour, it had a reduced tensile strength of 50 kg/cm² and recovery of 80%. However, other properties were not changed.

EXAMPLE 5

A vermiculite sheet obtained by the same method as in EXAMPLE 4, was immersed in dimethoxydimethylsilane for one minute. Thereafter, it was kept in a room at 25° C. under a humidity of 70% for 24 hours, followed by heating at 100° C. for 2 hours. It was confirmed that the sheet included 3.0% by weight of silanol. The sheet thus obtained had a tensile strength of 200 kg/cm², a compressive strength of not less than 1,500, kg/cm², a recovery of 85% under a pressure of 200 kg/cm² and a creep relaxation of not more than 4% under a pressure of 200 kg/cm² for 22 hours. When the sheet was heated at 400° C. for 1 hour, the tensile strength and recovery of this sheet were reduced to 50 kg/cm² and 80%, respectively. However, there was no noticeable change for other properties.

What is claimed is:

1. A process for the production of a strong composite sheet which comprises
   preparing vermiculite exfoliated and crushed into thin leaves having a high aspect ratio,
   stacking said thin leaves in layers to form a sheet by one method of natural sedimentation, filtration, compression molding and papermaking, and
   immersing said sheet in a silane compound in a liquid state or dissolved in a non-polar solvent to allow said silane compound to permeate into said sheet among said thin leaves and to react with water absorbed on the surface of each thin leave causing the hydrolysis of said silane compound, so that silanol in the amount of 0.5 to 5% by weight based on the weight of said sheet is formed on and among said thin leaves for strongly bonding said thin leaves with one another through said silanol.

2. The process according to claim 1, which further comprises mixing nonexfoliated vermiculite with said thin leaves before said step of stacking.

3. The process according to claim 1, wherein said silane compound is represented by one of the general formulas $R_{(4-n)}SiCl_n$ and $R_{(4-n)}Si(OR')_n$, in which R and R' stands for one of hydrogen and organic radicals and n stands for one of 1, 2, 3 and 4.

4. The process according to claim 3, wherein said hydrogen and organic radicals are selected from the group consisting of —H, —CH₃, —C₂H₃, —C₂H₅, —C₃H₇, —C₄H₉ and —C₆H₅.

5. A composite sheet produced by the process of claim 1.

6. A process according to claim 1, wherein the exfoliated vermiculite is prepared by chemical treatment in the presence of aqueous hydrogen peroxide.

* * * * *